United States Patent [19]

Pluim, Jr.

[11] Patent Number: 4,704,079

[45] Date of Patent: Nov. 3, 1987

[54] MOLD HAVING CERAMIC INSERT

[75] Inventor: Arthur W. Pluim, Jr., St. Paul, Minn.

[73] Assignee: Minnesota Mining and Manufacturing Company, St. Paul, Minn.

[21] Appl. No.: 850,776

[22] Filed: Apr. 11, 1986

Related U.S. Application Data

[62] Division of Ser. No. 596,067, Apr. 2, 1984, Pat. No. 4,614,630.

[51] Int. Cl.$^4$ ............................................. B29C 41/20
[52] U.S. Cl. ................................ 425/190; 249/114 R; 249/135; 425/556; 425/557; 425/588
[58] Field of Search .................... 249/114 R, 134, 135, 249/204; 425/184, 190, 556, 557, 588; 164/98, 113, 138; 264/219, 328.1, 328.2, 328.14, 328.16, 337, 338

[56] References Cited

U.S. PATENT DOCUMENTS

| | | | |
|---|---|---|---|
| 3,709,459 | 1/1973 | Bushrod | 249/134 |
| 3,752,218 | 8/1973 | Gamble et al. | 164/281 |
| 3,844,755 | 10/1974 | Angle et al. | 65/32 |
| 4,120,930 | 10/1978 | Lemelson | 264/225 |
| 4,139,677 | 2/1979 | Blair et al. | 428/409 |
| 4,383,672 | 5/1983 | Kreuttner | 249/134 |

FOREIGN PATENT DOCUMENTS 200405 7/1955 Australia .

Primary Examiner—Jay H. Woo
Assistant Examiner—Timothy W. Heitbrink
Attorney, Agent, or Firm—Donald M. Sell; James A. Smith; Richard Francis

[57] ABSTRACT

A improved mold, apparatus and method for injection molding is provided. The apparatus is of the type which includes a means for opening and closing a multi-part injection molding mold, means for supplying molten material under high pressure into the mold cavity when the mold is closed and means for removing articles molded in the cavity on cooling. The improvement is provided by a new multi-part mold which is made up of at least two parts. Each part of the mold comprises a mold block portion having a ceramic mold cavity insert. The ceramic mold cavity inserts define the walls of the mold cavity when the mold is closed. Each mold cavity insert comprises a shaped ceramic body having a mounting surface adapted to fit under compressive stress throughout the entire molding operation within a mounting cavity of the mold block portion. An improved method of injection molding is also provided having the steps of closing the multi-part mold, injecting molten material into the mold cavity under injection molding conditions including high pressure, permitting the molten material in the mold cavity to solidify, opening the mold, and removing the molded article. The improvement in the method comprises the use of the improved multi-part mold. The preferred ceramic material for the insert is silicon nitride, most preferably formed by freeze casting particulate silicon metal and reaction bonding the silicon metal in nitrogen to produce silicon nitride.

4 Claims, 2 Drawing Figures

MOLD HAVING CERAMIC INSERT

This is a division of application Ser. No. 596,067 filed Apr. 2, 1984, now U.S. Pat. No. 4,614,630.

TECHNICAL FIELD

The present invention relates to injection molding. More particularly, the present invention relates to an improved injection molding apparatus and method which utilizes a new multi-part mold which includes ceramic mold cavity inserts under compressive stress.

BACKGROUND ART

As a manufacturing technique, injection molding plays a significant role. Injection molding is the most important plastics processing method. Over 60% of all thermoplastics are injection molded. Injection molding is also used to produce parts from metals such as magnesium, lead, tin, zinc, aluminum and various alloys of these such as brass and other metals. The injection molding of metals is usually referred to as die casting, and may employ any of various apparatus including, for example, hot-chamber die-casting machines and cold-chamber casting machines. Injection molding may also be accomplished under vacuum.

Injection molding, whether the molding material is molten metal or plastic, involves forcing molten material under high pressure into molds called dies. The term "injection molding" is intended herein to refer to any molding or casting method which involves forcing molten material under high pressures, typically in excess of 35 kg/cm$^2$, into a mold or die. Injecting molding is closely related to permanent mold casting in that both processes employ reusable molds. The two processes differ, however, in the mold-filling methods. Whereas mold filling in permanent mold casting usually depends on the force of gravity or low pressure, typically up to about 10 kg/cm$^2$, injection molding involves flow into the mold cavity of hot molten material at velocities induced by the application of pressure. Because of this high-pressure filling, injection molding can produce shapes that are more complex, have thinner cross sections, higher strength and better surface finish than shapes that can be produced by permanent mold casting.

In injection molding, after the mold has been closed and locked, molten material is delivered to a pump, which may be a separate chamber or may be immersed in the molten material. The pump plunger is advanced to drive the molten material quickly through the feeding system while the air in the mold cavity escapes through vents. Sufficient molten material is introduced to fill the mold cavities and the over-flow wells. Pressure is maintained through a specified dwell time to allow the metal or plastic part to solidify. The mold is opened and the part is then ejected.

The injection molding mold usually consists of two sections which meet at the mold parting line. The two sections are typically closed and locked or clamped together to thereby define a cavity which is the counterpart of the item to be molded. Sufficient mechanical force is maintained between the mold parts to resist parting under the pressures employed in injection molding.

The mold cavity is typically machined into the two halves of the mold block or machined mold inserts are inserted into each mold block. Molds are customarily fitted with various items to assist in the casting operation, such as cooling channels, ejector pins and the like. A mold may have a single cavity or multiple cavities to form more than one part at the same time.

It is well recognized in the injection molding art that the utmost care must be exercised in the selection of the type of material used in making the molds. The most common material selected is tool steel. The composition of the materials from which the mold is formed has varied, depending upon the particular material being molded, its size and its design. Oil-hardened tool steel has been employed to produce molds of close tolerances and complicated shapes. Cheaper molds, where tolerances are not as critical, have been made of case-hardened ingot iron or machine steel. Such a mold, however, would be incapable of withstanding extremely high pressures and might tend to swell or distort over a long period of use. Steel alloys including nickel, magnesium, chromium and carbon have provided relatively satisfactory general-purpose molds.

Notwithstanding the composition of prior art molds, injection molding is extremely hard on molds. Although some last longer than others, they all suffer eventually because of distortion, erosion of the mold cavity surface, heat checking from thermal shock, and for other reasons. Various attempts have been made to improve the performance and/or life of molds by utilizing mold inserts, i.e., facings on the mold cavity of various materials which have improved properties to reduce wear, maintain tolerances, or for other purposes. For example, U.S. Pat. No. 3,709,459 (Bushrod) discloses the use of silicon nitride mold facings for use in permanent mold casting of lead or lead alloy electrode grids for electric storage batteries. Additionally, Blair et al (U.S. Pat. No. 4,139,677) discloses using a mold having molding surfaces formed of silicon carbide or nitride in a permanent mold for making glass elements.

The use of ceramic material as a facing or insert for injection molding dies is virtually unknown. This is not surprising since ceramic materials are generally known to have very poor resistance to mechanical impact as compared to the metals customarily employed to make molds. Moreover, even if one were to utilize a ceramic facing for a mold, as disclosed in either the Bushrod patent or in the Blair et al patent mentioned above, a suitable injection molding mold could not be produced by following the teachings of the prior art because ceramic materials have such a vastly different coefficient of expansion on heating than metals. The ceramic facing would expand at a different rate than the metallic backing or body of the mold and result in a misfit. Furthermore, upon injection of the molten material, the improperly fitted ceramic insert would crack or shatter because of its negligible resistance to impact and because of a lack of mechanical support due to the misfit. Additionally, while it is possible to coat a simple mold cavity wall with a facing of ceramic material, it would be difficult, if not impossible to coat a complex mold cavity wall with a uniform facing of ceramic material.

DISCLOSURE OF THE INVENTION

It has been discovered that a useful injection molding mold having a ceramic insert is provided if the ceramic inserts are adapted to fit under compressive stress throughout the entire molding operation within the mold body. That is, in order for a ceramic insert to be utilized in a mold cavity for high pressure molding, it is necessary to secure it in a mounting cavity in the mold block or mold body portion in such a way as to maintain it in a state of compressive stress throughout the molding or casting cycle. This will provide a tight fit of the insert in the mold block despite differences in the thermal expansion and thereby provide efficient transfer of impact energy and thermal energy to the mold block.

The invention provides an improved multi-part mold and apparatus for injection molding, that is, injection molding of plastic parts and die casting of metal parts, such casting typically being at pressures in excess of about 35 kg/cm$^2$. The apparatus is of the type which includes a means for opening and closing a multi-part injection molding mold, means for supplying molten material under high pressure and to the mold cavity when the mold is closed and means for removing articles molded in the mold on cooling. The improved mold includes mold parts, each of which comprises a mold body portion having a ceramic mold cavity insert. The mold cavity inserts define the walls of the mold cavity when the mold is closed. The mold cavity inserts comprise a shaped ceramic body having a mounting surface adapted to fit under compressive stress throughout the entire molding operation within a mounting cavity of the mold body portion.

An improved method of injection molding is also provided having the steps of closing the multi-part mold, injecting molten material into the mold cavity under injection molding conditions including high pressure, permitting the molten material in the mold cavity to solidify, opening the mold, and removing the molded article. The improvement in the method comprises the use of the improved multi-part mold.

The improved apparatus and molds provide greater mold dimensional stability; therefore parts of more accurate dimensions may be molded. The molding surfaces provided by the inserts are more resistant to the molten materials and to high temperatures than metal mold surfaces. Ceramic mold surfaces retain their surface finish, thus substantially eliminating the need for periodic mold surface refinishing. Ceramics maintain much greater strength and hardness at elevated temperatures, thus allowing the molding of metals of higher melting points such as brass, ferrous alloys, etc. The use of a ceramic insert minimizes thermal distortion or tolerance shifting within the mold, permitting the easier production of precision parts. The molds are much easier to prepare since most can be easily cast, with minor machining modifications, from relatively low cost materials.

The perferred ceramic material for the insert is silicon nitride, most preferably formed by freeze casting particulate silicon metal and reaction bonding the silicon metal in nitrogen to produce silicon nitride.

BRIEF DESCRIPTION OF DRAWINGS

The invention is further described by reference to the drawing, wherein.

BEST MODE FOR CARRYING OUT THE INVENTION

The injection molding apparatus and method described herein are conventional types. Any of a variety of injection molding devices may be employed. Injection molding devices which may be improved by the present invention include plastic injection molding machines and die casting machines such as hot-chamber machines, horizontal cold-chamber machines, vertical cold-chamber machines, horizontal machines for feeding and casting under vacuum, and the like.

Figure 1:
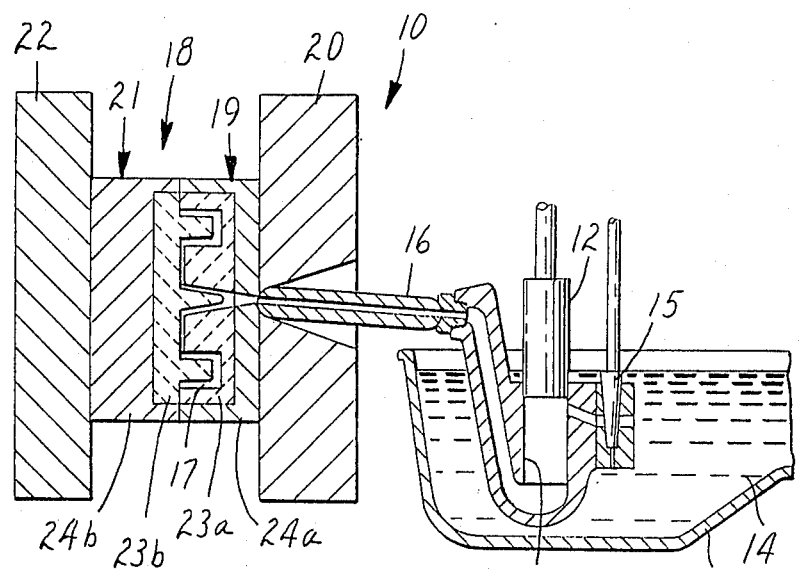
FIG. 1 is a schematic cross sectional view of an injection molding apparatus according to the present invention.
Figure 2:
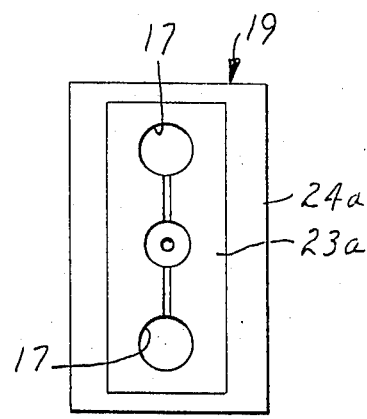
FIG. 2 is an enlarged plane view of a portion of an improved injection molding die according to the present invention.

FIG. 1 of the drawing shows one example of a conventional molding apparatus which is improved by the present invention. In FIG. 1 a conventional hot-chamber die-casting machine 10 includes customary molten metal bath 11 having shot plunger 12 which operates in pressure cylinder 13 in communication with the molten metal 14 in bath 11. The supply of molten metal is controlled by feed-cut off plunger 15. Upon operation of shot plunger 12 molten metal travels through nozzle 16 under pressure to mold cavity 17 of mold 18. Mold 18 includes mold cover half 19 supported by cover platen 20 and ejector mold half 21 supported by ejector platen 22. Each of the mold halves has a mold insert 23a and 23b of ceramic material under compressive stress respectively in mold blocks 24a and 24b. The ceramic material may be any suitable ceramic material which would, under compressive stress, withstand the rigors of injection molding. Suitable ceramic materials include silicon nitride and silicon carbide, the former being preferred.

There are many ways of securing the ceramic insert so that it is maintained in a state of compressive stress throughout the molding cycle. A method of securing a ceramic mold insert to provide a mold useful for molding plastics and low melting metals and their alloys such as lead, tin, bismuth, zinc and the like is by shrink fitting the ceramic insert into the mold block. In this procedure, the mold block is machined such that the insert cavity is slightly smaller, e.g., 0.01 mm smaller, than the insert. The mold block is then heated so that it expands, e.g., at a temperature of about 400° C. to 500° C., taking care not to heat soften the steel, and the insert placed within the mold block cavity. Upon cooling the block, it shrinks around the insert, leaving the insert under compressive stress. Optionally, the insert may be cooled in a freezer or by contact with dry ice.

Shrink fitting is not the preferred means for placing inserts within the mold block for a mold which will be used to mold aluminum or brass because the working temperature of the mold will be somewhat higher and the mold block may expand too much and reduce to an ineffective level the compressive stress between it and the insert. The preferred manner of inserting ceramic inserts in the mold block destined for use at high temperatures is by mechanical wedging. Mechanical wedging is preferred because it is possible to more easily select the amount of compressive stress by selecting the amount of mechanical force applied in wedging. In one wedging method, the mold block cavities are machined to have two adjacent straight-sided walls and sufficient space to accept the wedging mechanism which preferably consists of two wedges, each of which has a slanted side facing the insert, slanted so as to prevent the withdrawal of the insert and apply clamping forces when secured in the mold block. The ceramic insert is machined so that the two adjacent sides are vertical and perpendicular to its base. The remaining adjacent sides are machined to provide an angled base, slanted outward towards the base for engagement with the wedges.

The preferred method of making the silicon nitride ceramic inserts, which is capable of producing multiple inserts with great precision, i.e., with very little dimensional variation between inserts, requires the following steps. In the first step, substantially pure silicon metal powder having a particle size of about 45 micrometers or finer is mixed with binder, preferably as a solution comprising organic binder and a solvent for the binder, to form a substantially viscous, homogeneous slurry. The binder may be liquid, e.g., water or an organic liquid or a solid material dissolved or dispersed in a liquid vehicle. Mixing may be accomplished with a low speed, high torque mixer under conditions which minimize air entrapment. The amount of solid binder used is maintained at a minimum, it being at least the amount necessary to obtain particle to particle bonding of silicon metal particles in the powder without filling spaces between particles upon removal of the solvent. The resultant substantially viscous, homogeneous slurry is then used to fill a master pattern mold which has a cavity with a desired shape. The particles of metal powder in the slurry are then densified, preferably by centrifuge, to obtain a molded green structure. The molded green structure is then frozen in the master pattern mold, removed from the master pattern mold (while it is still frozen) and dried to remove solvent and to provide a molded green article which is self-supporting when dried. The dried article is then heated to substantially remove all of the solvent and fired at a controlled firing rate to prevent damage to the resultant fired article in a nitrogen-containing, non-oxidizing atmosphere to remove binder and convert the silicon metal to silicon nitride. The binder may be removed before the firing step.

The dried green structure may be shaped or surface finished after removal from the pattern mold to add surface modifications which are unavailable by molding e.g. through holes, threads, etc. or to improve the surface of the cast green article.

The preferred binder is selected from a group consisting of water-dispersed polyurethanes, acrylate latices, hydroxy propyl cellulose and polyvinyl alcohol. The solvents which may be utilized with such binders include water and tertiary butyl alcohol. Preferred solvent-binder combinations include hydroxy propyl cellulose with tertiary butyl alcohol and polyvinyl alcohol with water. Typical concentrations of binder in solvent are on the order of 3 to 5%, by weight.

The slurry may be prepared using a low-speed, high shear mixer such as a mixer of this type manufactured by the Hobart Company. Mixing is continued until a smooth slurry is obtained, typically in about 5 to 10 minutes. The slurry is poured into the selected master mold which may be formed of aluminum, plastic or rubber, and may be settled by hand bumping on a hard surface.

The filled molds are then placed in a centrifuge to densify the material. Normally about 90% of the green density is achieved in about 3 minutes with centrifuging at 1000 RCF. The centrifuge time may be longer or shorter, depending upon the particular binder-solvent selected.

The filled molds are then frozen, preferably employing a commercial freezer, although dry ice, liquid nitrogen or brine solutions may be employed. The green article is then removed from the mold while frozen and allowed to dry at about 20° to 30° C. (room temperature) for about 24 hours. This initial drying step is performed in a controlled atmosphere to prevent water condensation on the frozen part. The green article is then permitted to stand an additional 12 hours in ambient conditions and then further dried in an oven for 12 hours at 44° C., followed by an additional 4 hours at 100° to 120° C.

At this point, the green article may be machined, if desired, to adjust any specification requirements. The green article is nitrided in a furnace preferably heated at least to 1420° C. but less than 1450° C. for a period of at least 16 hours. The heating times may vary between 16 and 48 hours. The nitriding gas may be conventional commercially pure nitrogen. The resultant nitrided article typically has a density in the range of 1.8 to 2.6 grams per cc and a compressive strength of $150 \times 10^6$–$300 \times 10^6$ Nm$^{-2}$.

A preferred binder system is 5% hydroxy propyl cellulose in tertiary butyl alcohol because it freezes quickly and dries fast. Other useful solvents which may be used in place of tertiary butyl alcohol include benzene, formamide, pinacolyl alcohol and t-amyl alcohol. Care should be taken when employing a resin - water binder system because excessive centrifuging could cause defects in the green structure.

Excessive quantities of conventional mold release agents are preferably not utilized in the mold because they may cause surface defects. The preferred procedure is to spray silicone mold release agent such as "RAM" 225 onto the metal mold surface followed by rubbing or polishing to remove excess release agent from the surface and leave a uniform film.

As described, ceramic inserts may be produced having tolerances heretofore unachieved by prior art methods at a cost which is several orders of magnitude less than preparing comparable parts by machining hardened tool steel.

EXAMPLES

The invention is illustrated by the following Examples wherein all parts are by weight unless otherwise indicated.

Example 1

Ceramic mold inserts were prepared by first mixing a master batch consisting of 100 parts 325 mesh (average particle size 45 mm) silicon powder having 98.6% purity and available from Alcan Industries and 39 parts of 8.7% water solution of polyvinyl alcohol available under the trade designation "Elvanol" 90/10 from the E. I. Du Pont de Nemours Company. Mixing was accomplished using a "Hobart" low speed mixer for approximately 5 minutes. This amount of polyvinyl alcohol was selected to provide 2.03% binder in the dry part.

One half an original which was assemblable with a second half to provide a shape of a detailed figurine was placed at the bottom of a hollow cylinder and a sufficient volume, approximately 250 grams, of the master batch was poured into the hollow cylinder to cover the half part. The cylinder and its contents were then placed in a centrifuge and spun at 1000 RCF for 3 minutes and an additional 1¼ minute braking time. The cylinder was then removed from the centrifuge any supernatant liquid poured off, and the cylinder and its contents placed in crushed dry ice for approximately five minutes. The cylinder was then removed from the dry ice and its contents removed within approximately a 3 minute period of time, leaving a frozen green structure from which the original half part was removed, leaving a mold half cavity.

A second frozen molded green structure with the remaining portion of the mold cavity was made in the same manner using the other original half part. The two frozen green structures were then dried, first by heating under two 150 watt infrared heat lamps at a distance of about 20 centimeters between the lamp and the green structures for approximately 2 hours. The molded green structures were then placed in a circulating air oven at 100° C. and dried to achieve a constant weight, that being approximately 4 hours of drying time.

While still in the green condition, each silicon powder compact (hereinafter called the "green insert") was machined (using bonded carbide tools) square with its four sides flat and opposite sides parallel to each other so that they were perpendicular to the top and bottom within 0.0125 mm. The top area around the mold cavity and bottom were also machined flat and parallel with respect to each other within 0.0125 mm. Appropriate vents and gates were also machined into the green insert.

The silicon metal particles of the green insert were then nitrided by furnacing in a nitrogen atmosphere for 24 hours at 1420° C. Minor tolerance adjustments to achieve final fit in mold blocks were accomplished with diamond tooling. Mold blocks to receive the ceramic inserts were prepared from 4140 mill treated tool steel. A mounting cavity was machined into each block such that the cavity was 0.0125 mm/side smaller than the insert. The mold block cavity was then expanded by heating the block to a constant temperature in the range of 430°–540° C. While the mold block was at a temperature in this range, the insert (at room temperature) was placed into the expanded cavity. The mold block was then cooled to shrink it around the insert. Each insert had been machined so that once inserted it would project 0.025 mm above the surface of its mold block so that the exposed machined edges of the inserts mated as the mold was closed. The compressive stress calculated at room temperature was 252 kg/cm$^2$. The calculated compressive stress at a working temperature of 120° C. was 140 kg/cm$^2$. An insert secured in this manner is also useful for injection molding at temperatures up to 290° C. for materials such as plastics and low melting metals such as lead, tin, bismuth alloys and zinc.

The resultant mold was used to successfully make parts in connection with a 75 ton plastics injection molding machine.

Example 2

An improved injection molding mold was prepared by mechanically wedging shaped silicon nitride ceramic mold inserts, prepared as described above in Example 1 except the binder was a self-crosslinking acrylic latex to provide a dry binder weight of about 2%, into a mold body mounting cavity. The acrylic latex was a butyl acrylate-methyl- acrylate-2-hydroxyethyl acrylate-methacrylic acid-glycidyl methacrylate latex having a weight ratio of components in the order set forth of 25:45:14:10:6, 33.9% solids, a Brookfield viscosity of 18.3 centipoise using a No. 15 spindle at 60 RPM at room temperature, a pH of 3.4 and an inherent viscosity of 0.96 dl/g in methyl ethyl ketone. The mold inserts were machined so that the top and bottom were flat and parallel within 0.0125 mm. The sides were machined square with opposite sides parallel. Two adjacent sides were machined flat and perpendicular to the base within 0.0125 mm and the other two adjacent sides were machined to have an angle of 85° relative to the base. Appropriate gating and vents were also machined into the green inserts. After machining, the silicon metal particles were nitrided in a nitrogen atmosphere for 24 hours at 1430° C. Minor tolerance adjustments to achieve final fit in the mold block were made with diamond tooling. A mold block was prepared from 4140 mill treated tool steel. A mounting cavity was machined into the mold block with two adjacent sides straight and perpendicular to the base of the cavity within 0.0125 mm and the other two adjacent sides also straight but with a sufficient space to fit two tool steel wedges having a rectangular shape except for one side which was machined to have a complementary angle to the 85° angled portion of the silicon nitride mold insert. Bolts through the back of the mold block inserted into threaded holes in the wedge blocks were used to urge the wedge blocks against the ceramic insert until the requisite compressive stress was reached. The silicon nitride insert was set flush with the surface of the mold block. The bolts tightened in this manner generated a calculated compressive stress of about 1000 kg/cm$^2$ at room temperature. At 480° C., the approximate aluminum casting temperature, the calculated stress was about 500 kg/cm$^2$. At brass casting temperatures of 820° C., the stress would be about 110 kg/cm$^2$.

I claim:

1. An improved apparatus for injection molding including means for opening and closing a multi-part injection molding mold;

said injection molding mold comprising mold parts which are engagable when said mold is closed to define walls of a mold cavity, means for supplying molten material under high pressure into said mold cavity when said mold is closed; and means for removing articles molded in said mold on cooling;

the improvement comprising each of said mold parts comprising a mold block portion having a mounting cavity therein, and a mold cavity insert fitted within said mounting cavity, said insert comprising a shaped ceramic body having a mounting surface adapted to fit under compressive stress within said mounting cavity of said mold block portion throughout an entire molding operation involving closing said mold, filling said mold, opening said mold, and removing an article molded therein, said mold parts being engagable when said mold is closed so that said mold cavity inserts define the walls of said mold cavity.

2. The apparatus of claim 1 wherein said ceramic comprises silicon nitride.

3. A multi-part mold suited for use in an injection molding apparatus comprising mold parts, each mold part comprising a mold body portion having a mounting cavity therein;

a mold cavity insert fitted within said mounting cavity, said insert comprising a shaped ceramic body having a mounting surface adapted to fit under compressive stress within said mounting cavity of said mold block portion throughout an entire molding operation involving closing said mold, filling said mold, opening said mold, and removing an article molded therein, said mold parts being engagable when said mold is closed so that said mold cavity inserts define walls of mold cavity.

4. The mold of claim 3 wherein said ceramic comprises silicon nitride.

* * * * *